MAGNETIC RECORDING MEDIUM

Filed Sept. 23, 1959

INVENTORS.
BENJAMIN B. BAUER &
DENNIS GABOR
BY
Brumbaugh, Free, Graves & Donohue
their ATTORNEYS.

United States Patent Office 3,052,567
Patented Sept. 4, 1962

3,052,567
MAGNETIC RECORDING MEDIUM

Dennis Gabor, London, England, and Benjamin B. Bauer, Stamford, Conn., assignors to Minnesota Mining & Manufacturing Company, St. Paul, Minn., a corporation of Delaware Filed Sept. 23, 1959, Ser. No. 841,778
2 Claims. (Cl. 117—76)

This invention relates to magnetic recording media and, more particularly to magnetic recording media having improved recording and reproduction characteristics at medium and short wave lengths.

The recording and reproduction characteristics of conventional magnetic recording media such as magnetic tapes are relatively poor in the middle and short wave frequency ranges in comparison to their characteristics at lower frequencies. This is due to the fact that the magnetic field set up by a high frequency signal does not penetrate the medium as deeply as the field set up by a low frequency signal. Consequently, a high frequency signal induced magnetic field does not couple as many of the ferromagnetic particles making up the medium as a low frequency signal induced field does, and the recording and reproduction characteristics of conventional media become increasingly poor as the frequency of the signal increases.

Accordingly, it is the purpose of the present invention to provide magnetic recording and reproduction media having improved characteristics at medium and high frequencies. This is attained in a representative embodiment of the invention by providing a medium that includes a base to which two adjacent layers of ferromagnetic particles are secured. The particles in a first one of the layers are magnetically aligned in a first direction, and the particles in the second of the layers are aligned in a direction that is substantially perpendicular to the direction of alignment of the particles in the first layer.

The medium is disposed in relation to the fields set up by high and low frequency signals so that the low frequency signal induced field penetrates the first and second of the layers, and the high frequency signal induced field penetrates principally the second of the layers. The alignment of the particles in the second of the layers is such that a denser concentration per unit length of the particles is provided at the depth to which the middle and high frequency signal induced magnetic fields penetrate than would be provided with a different alignment, and, therefore, this layer provides improved recording and reproduction characteristics at these frequencies.

This invention may be better understood from the following detailed description taken in conjunction with the accompanying figures of the drawing in which.

Figure 1:
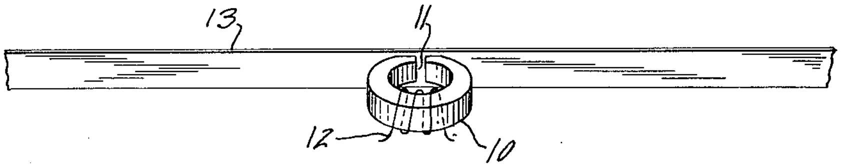
FIG. 1 is a schematic illustration of typical magnetic recording and reproducing means.

With reference to FIG. 1, there is illustrated typical magnetic recording and reproducing means that includes a core 10 having an air gap 11 formed therein. A winding 12 is coupled to the core 10 and is adapted to be connected to the output of a conventional signal providing means, not shown. A magnetic recording medium 13 such as a magnetic tape, is conventionally mounted so that it can be drawn past the core and subjected to the magnetic field set up in the vicinity of the air gap 11 when a signal is impressed on the winding 12.

Figure 2:
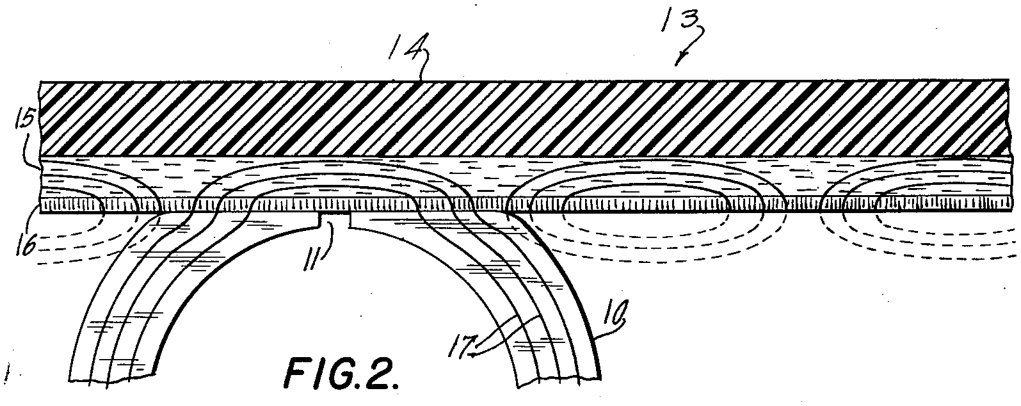
FIG. 2 is a partly-sectional view illustrating the operation of a magnetic recording medium constructed in accordance with the invention, looking towards one of the narrow edges of the medium.
Figure 3:
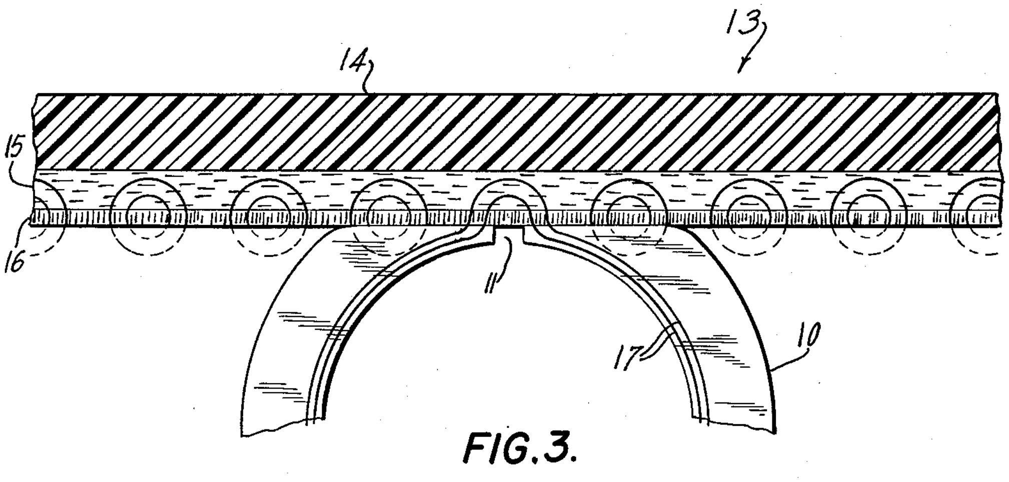
FIG. 3 is a partly-sectional view further illustrating the operation of the magnetic recording medium illustrated in FIG. 2.

The magnetic recording medium 13, illustrated in detail in FIGS. 2 and 3, includes a base 14 (shown in section) and two adjacent superimposed layers 15 and 16 having ferromagnetic particles embedded therein. The base 14 may be conventionally constructed out of such materials as paper, cellulose acetate, mylar, etc. The particles in the layers 15 and 16 are embedded in a conventional binding material.

The layer 15 is formed by coating the base 14 with a binding material containing the particles and before the binding material has set, passing the medium through a magnetic field that orientates the particles lengthwise of the base 14. After the binding material in the layer 15 is dry, the second layer 16 is formed by coating the layer 15 with a similar binding material having magnetic particles embedded therein and passing the medium through a magnetic field that is orientated perpendicularly to the base 14.

In operation, a signal is impressed on the winding 12, FIG. 1, which sets up magnetic lines of flux 17 in the core 10. Low frequency signals set up a relatively strong magnetic field that penetrates the inner layer 15, as shown in FIG. 2. However, when high and medium frequency signals are being recorded, the magnetic field set up thereby will not penetrate as deeply and does not travel as far in a lengthwise direction as a magnetic field set up by a low frequency signal. As shown in FIG. 3, the lengthwise component of travel in the medium of the magnetic field set up by a high frequency signal is relatively short in comparison to the lateral component of travel. Therefore, by providing the layer 16 having ferromagnetic particles aligned perpendicularly to the base 14, more particles per unit length at the depth to which the high frequency signal induced field penetrates are provided and the recording and reproduction characteristics of the medium are improved and the surface noise of the medium is substantially reduced.

As an indication of the degree of improvement obtainable with the invention, a double coated tape made as described above with particles having an anisotropy ratio (the ratio of the lengthwise permeability to the crosswise permeability of the particles) of 3 enables a gain of 4.77 db in the signal energy to be achieved.

The layer 16 should be very thin, generally not exceeding the length of a few of the particles embedded therein which may be of the order of two to three microns in width. Since this layer is very thin, the performance of the medium at low frequencies is not affected.

While it is preferred that the ferromagnetic particles be needle-shaped, they could just as well have other shapes. The particles making up the two layers 15 and 16 may be the same and be made of an iron oxide or the particles in the layer 16 may, if desired, differ from the particles in the layer 15 in that they have a higher coercive force and lesser remanence.

Since the particles in the layer 16 are oriented perpendicularly to the tape, the concentration of particles per unit length of the tape in the depth to which the magnetic field penetrates during the recording of high frequencies will be greater than where the particles are disposed lengthwise of the tape. Hence, surface noise is substantially diminished and an improvement about 9.5 db can be obtained with tape embodying the invention.

While a particular embodiment of the present invention has been shown and described for purposes of illustration, it is apparent that changes and modifications may be made thereto without departing from the invention in its broader aspects. Therefore, the invention described herein is not to be construed as limited to the specific embodiment described but is intended to encompass all modifications thereof coming within the scope of the following claims.

We claim:

1. A magnetic recording medium comprising a base, a first layer of ferromagnetic particles and a second layer of ferromagnetic particles, said first and second layers of ferromagnetic particles being dispersed in a binder secured to said base, said ferromagnetic particles making up said first layer being aligned substantially parallel to the plane of said base, said ferromagnetic particles making up said second layer being aligned substantially perpendicular to said base, and said second layer having a thickness of the order of two to three microns.

2. A magnetic recording medium comprising a base, a first layer secured to said base having a first plurality of ferromagnetic particles dispersed in a binder, said first plurality of particles being aligned in a direction parallel to the plane of said base, a second layer secured to said first layer having a second plurality of ferromagnetic particles dispersed in a binder, said second plurality of particles being aligned substantially perpendicular to the direction of alignment of said first plurality of particles and said second layer having a thickness of the order of two to three microns.

References Cited in the file of this patent

UNITED STATES PATENTS

| | | |
|---|---|---|
| 2,643,130 | Kornei | June 23, 1953 |
| 2,796,359 | Speed | June 18, 1957 |

Notice of Adverse Decision in Interference

In Interference No. 93,479 involving Patent No. 3,052,567, D. Gabor and B. B. Bauer, Magnetic recording medium, final judgment adverse to the patentees was rendered Nov. 27, 1963, as to claims 1 and 2.

[*Official Gazette February 4, 1964.*]